United States Patent

Bishop, III et al.

[11] Patent Number: 6,135,481
[45] Date of Patent: Oct. 24, 2000

[54] BOAT SECURING AND RELEASING DEVICE

[76] Inventors: Walter M Bishop, III, 216 Red Oak Dr., Manchester, Tenn. 37355; Walter M Bishop, Jr, 165 S. Arrowhead Dr., McMinnville, Tenn. 37110

[21] Appl. No.: 09/267,184

[22] Filed: Mar. 12, 1999

[51] Int. Cl.[7] .................................................. B60P 7/00
[52] U.S. Cl. ........................................ 280/414.1; 414/529
[58] Field of Search ............................ 114/344; 414/529, 414/530, 531, 532, 533, 534, 535, 536; 280/477, 414.1, 414.2, 414.3

[56] References Cited

U.S. PATENT DOCUMENTS

| | | |
|---|---|---|
| 2,904,303 | 9/1959 | Gentiline ............................ 414/529 X |
| 3,632,138 | 1/1972 | Whitely, Jr. . |
| 3,750,805 | 8/1973 | Finney . |
| 3,938,829 | 2/1976 | Anderson . |
| 3,963,263 | 6/1976 | Whitlock . |
| 3,989,267 | 11/1976 | Robinson . |
| 4,114,920 | 9/1978 | Boettcher et al. . |
| 4,242,768 | 1/1981 | Winsett ............................. 414/529 X |
| 4,463,965 | 8/1984 | Lawson ............................... 280/414.1 |
| 4,623,161 | 11/1986 | Sprague .............................. 280/414.1 |
| 4,641,598 | 2/1987 | Hodges ................................. 114/344 |
| 4,641,851 | 2/1987 | Knies ................................. 280/414.1 |
| 4,919,446 | 4/1990 | Higgins ............................. 414/529 X |
| 5,000,471 | 3/1991 | Sumrall .............................. 280/414.1 |
| 5,120,079 | 6/1992 | Boggs ................................ 280/414.1 |
| 5,263,733 | 11/1993 | Kastenberger et al. ............. 280/414.1 |
| 5,666,901 | 9/1997 | Jones ................................. 414/529 X |

Primary Examiner—Frank E. Werner

[57] ABSTRACT

A releasing and securing assembly affixed to the starboard or port side of a boat and trailer is disclosed to temporarily release or secure a boat to a trailer while loading and unloading a boat on a boat ramp.

7 Claims, 8 Drawing Sheets

BOAT SECURING AND RELEASING DEVICE

CROSS-REFERENCES TO RELATED APPLICATIONS

1. Background—Field of Invention

This invention relates to a securing means, specifically to a locally and remotely controlled assembly for releasing and securing a boat to a boat trailer while the boat is unattached to the trailer winch.

2. Background—Description of Prior Art

The recently introduced "drive-on" trailer arrangement makes it possible to drive the boat onto the partially submerged trailer using the propulsion of the boat motor. The boat, upon being fully loaded, may be secured to the trailer by a winch or the like means. The prior art therefore requires that an operator perform an action e.g. connect the winch on the outside of the boat while in the water. Moreover, the arrangement requires one operator to pilot the boat and another to secure the boat by the winch. Many boat users try to pull the boat out of the water with out connecting the winch to the boat, which often results in the boat sliding off of the trailer, and onto the ramp causing many dollars of damage. Much of the prior art is latching devices that will utilize the front of the boat or the transom. We have found through experimentation that these are not optimum boat locations to use for the following reasons: The prior art devices that utilize the front of the boat are difficult to use consistently because cross currents will often change the yaw of the boat and varying ramp angle will change the pitch of the boat with respect to the trailer. These changes make boat to trailer latching unpredictable. It is not uncommon for the boat operator to have to make several attempts to make the prior arts' devices work properly. The trailer may even have to be moved up or down the ramp to get the right locational relationship between the boat and trailer for the devices to work. It is therefore desirable for a device to be controlled from the boat driver's seat by the boat operator that consistently functions properly regardless of the waters cross current of the angle of the ramp.

The following U.S. patents disclose developments in the field of loading boats onto boat trailers:

U.S. Pat. No. 3,750,805 (1973)
U.S. Pat. No. 3,963,263 (1976)
U.S. Pat. No. 4,114,920 (1978)
U.S. Pat. No. 4,463,965 (1984)
U.S. Pat. No. 4,623,161 (1986)
U.S. Pat. No. 4,641,598 (1987)
U.S. Pat. No. 4,641,851 (1987)
U.S application Ser. No. 08/506,401 (Jul. 24, 1995)

None of the above patents discloses the specific structure of the invention which will consistently and temporally lock the boat onto the trailer, controlled by the boat driver, without anyone climbing out of the boat or wading into the water to secure the boat to the trailer.

Heretofore many latches have been devised to release and secure a boat, but each one has one or more significant drawbacks. One such apparatus shown in U.S. Pat. No. 3,632,138 to Whitely (1972) shows a boat trailer including a latch structure operative in loading and unloading a boat. The trailer includes a curved latch bar portion secured to the trailer adapted to co-act with a latch catch mechanism supported on the prow of the boat. However, the latch catch mechanism must be manually preset outside of the boat, to a position capable of receiving and latching to the latch bar. In addition we have found through experimentation that the front or prow of the boat is not the most desirable or reliable location for a securing device.

Anderson in U.S. Pat. No. 3,938,829 discloses a latch device fitted to a trailer. The latch is designed to engage an elongated bow eye mounted on the bow of the boat. In operation, the latch includes a spring-loaded lockable bar, which may be deflected by the incoming bow eye. To release the bow eye the bar may be secured in a retracted position by means of a pawl. However, the bar must be manually released from its retracted position to enable it to receive the modified bow eye upon loading the boat. This act cannot be accomplished in the boat driver's seat. This invention also discloses a device, which has the same inherent problem as that of the Whitely invention. In addition, the main components of the device is left on the boat trailer which would be susceptible to vandalism while left unattended at the boat ramp.

Whitlock in U.S. Pat. No. 3,963,263 discloses a latch for engagement with the bow of the eye of a boat. The latch includes a pair of spring loaded strikers which deflect against the bias to receive the bow eye of a boat automatically close behind the bow eye due to the action of the bias. However, the bow eye must be manually released from the latch prior to launching and cannot be reset by the boat operator from his seat. Again, this invention operates on the front of the boat, which is not optimal.

Robinson in U.S. Pat. No. 3,989,267 (1976), shows a spring loaded bolt capable of being locked in an open position where by it is adapted to snap into closed position upon activation of a trigger by an oncoming bow eye of a boat where by to engage the bow eye is described. However, the bolt must be manually retracted to open position to enable launching of the boat. This concept also has the potential for safety problems if it is in the loaded state while unattended at a boat ramp. Similar comments are applicable to the fastening assembly described in U.S. Pat. No. 4,114, 920 (Boettcher, 1978) and U.S. Pat. No. 5,120,079 (Boggs, 1992). This device is also located at the front of the boat, which is less than optimal. See Whitely Knies in U.S. Pat No. 4,641,851 (1987) describes a hook arrangement including a pivotal hook movable from an open position and a closed position by an adjustable handle. The standard bow eye found on most boats is not readily adapted for complementary engagement with the described hook. This device also relies on operation on the front of a boat. See Whitely Higgins in U.S. Pat. No. 4,919,446 (1990) describes an invention with a spring-loaded bolt requiring pre-setting prior to boat loading. Similar comments are applicable to the fastening system described in U.S. Pat No. 5,000,471 (Summerall, 1991) which describes a latch mechanism that must be pre set to receive and secure an oncoming bow eye of a boat. This type of device could cause serious damage to an individual's hand if the device is left in the "spring-loaded" position while unattended at a boat ramp. This device also operates on the front portion of a boat (See Whitely). In addition, the primary portion of this device is located on the trailer (See Anderson).

Kastenberger in U.S. Pat. No. 5,263,733 (1993) discloses a hook member adapted for engaging an added complementary eye member mounted on the boat to the existing boat eye. The hook latch mechanism disclosed operates in a vertical plane and therefore requires the addition of a horizontally mounted bow eye. The exact geometric shape of the hook is not disclosed. However there appears to be a potential for the latch to resist releasing if the weight of the boat puts the hook in tension. The binding action between the hook and the bow eye would cause the releasing operation to be unreliable. Again, this invention operates on the front of the boat. Refer to Whitely above for comments.

Bishop in U.S. application Ser. No. 08/506,401 (Jul. 24, 1995) discloses a transom mounted releasing and securing device. We have found through experimentation, that while the device has appreciable characteristics it lacks the consistent operation inherent in a rear mounted latching device.

Prior to the advent of self-loading boat trailers, standard boat trailers were fitted with winches at the front end of the trailer. The winch had a rope with a hook on the end for engagement with the boat eye of a boat for manually pulling the boat onto the trailer when the rear portion of the trailer was submerged in the water at an inclined boat ramp. This usually necessitates a two-man operation, one person in the boat and the other working the winch. The above prior art all have appreciable characteristics and functions, however no single prior art structure has all of the desired functions that our invention provides e.g. consistent and repeatable launches and loads on the ramp controlled by the boat operator.

OBJECTS AND ADVANTAGES

Accordingly, the primary object and advantage of our invention is to provide a practical consistent and reliable boat releasing and securing device which will mount to a side of the boat where an actuator may interlock with a trailer post mounted on the trailer frame therefore securing the boat to the trailer until located to a more convenient location to hook the winch.

A primary object of our invention is to locate the releasing/securing device at a location on the boat that would eliminate problems encountered by the prior art. Prior art devices are located at the front and rear of a boat and are difficult to latch because of the inconsistent positions of the front and rear of the boat with respect to the trailer when loading with cross currents and elevation changes due to various ramp angles. Through much experimentation, we have found the optimum location for a boat-latching device that will greatly eliminate the problem of consistent operation. This is accomplished by installing our latching device near the horizontal center of rotation on either the starboard or the port side of the boat.

A further object of the present invention is to release and secure the boat from the trailer without having to manually reset the assembly outside of the boat for operation.

A further object of the present invention is to provide a safer securing system without having spring loaded pins and hooks that are trigger operated which could cause bodily harm while the trailer is unattended while parked at a ramp in an unloaded state.

A further advantage of the present invention is to provide a securing assembly, which is designed to operate easily while under extreme loading forces by eliminating any binding of components caused by the boat's forces being imposed on the latch A further object of the present invention is to provide a securing system that requires little boat or trailer modifications.

A further object of the present invention is to allow the boat to be released, if desired by the operator, after the boat is on the ramp and in the water.

A further advantage of the present invention is to allow easy one-man launch and load operations.

A further object of the invention is the simplicity of the assembly.

A further advantage of the invention is that all major components of the invention will be in close proximity to the boat operator during boating and not left unattended at a ramp.

A further advantage of the invention is that all original winching equipment may be left completely intact and still used if the boat motor fails and cannot provide power to drive the boat onto the trailer.

A further object of the invention is to facilitate the loading of boats on shallow ramps.

A further advantage of the invention is to decrease the amount of time spent during the unloading and loading process on the ramp by eliminating the need to use the winch and hook on the trailer while the boat is in the water on the ramp.

A further object of our invention is to provide a positive locking action once the boat is loaded.

A further object of our invention is that it allows the boat to still be secured onto the trailer even if it is not all the way up against the winch on the trailer.

Still further objects and advantages will become apparent from a consideration of the ensuing description and accompanying drawings.

SUMMARY

Principal features of the invention include an assembly to temporarily secure a boat to a trailer until the boat may be secured with the existing winch system at a more convenient location. In addition, our invention will keep the boat secured to the trailer during releasing after the winch has been disconnected until the boat is in the water and the operator is ready to release the boat. The assembly consists of an actuator mounted to the starboard or port side of a boat and trailer near the horizontal center of rotation of the boat, which may be controlled by the operator while in the boat driver's seat

REFERENCE NUMERALS 10 boat
12 releasing/securing device
14 base plate
16 base plate fasteners
18 engaging arm
20 engaging arm pivot bolt
22 control rod 24 control rod spherical bearing
26 control rod pivot bolt
28 control rod clevis
30 control rod clevis bolt
32 control rod stand-off
34 stand-off block fastener
36 ratchet plate
38 ratchet teeth
40 lever arm
42 lever arm pivot bolt
44 lever handle
46 release trigger
48 trigger return spring
50 ratchet finger
52 ratchet finger pivot bolt
54 ratchet finger to trigger fastener
56 trailer
58 trailer post assembly
60 trailer post base plate
62 trailer plate bolts
64 cross member
66 trailer post
68 actuator pivot bolt
70 winch
72 actuator
74 actuator rod
76 actuator rod spherical bearing
78 actuator rod pivot bolt
80 air hose
82 air pump
84 foot pedal
86 two-way pneumatic actuator
88 four-way valve
90 actuator stand-off
92 ratchet pawl
94 ratchet pawl pivot bolt
96 return spring
98 ratchet pawl stop
100 pawl limit stop

PREFERRED EMBODIMENT—DESCRIPTION

The preferred embodiment herein described is not intended to be exhaustive or to limit the invention to the precise form disclosed. It is chosen and described to best explain the principals of the invention so that others skilled in the art may utilize the invention.

Figure 1:
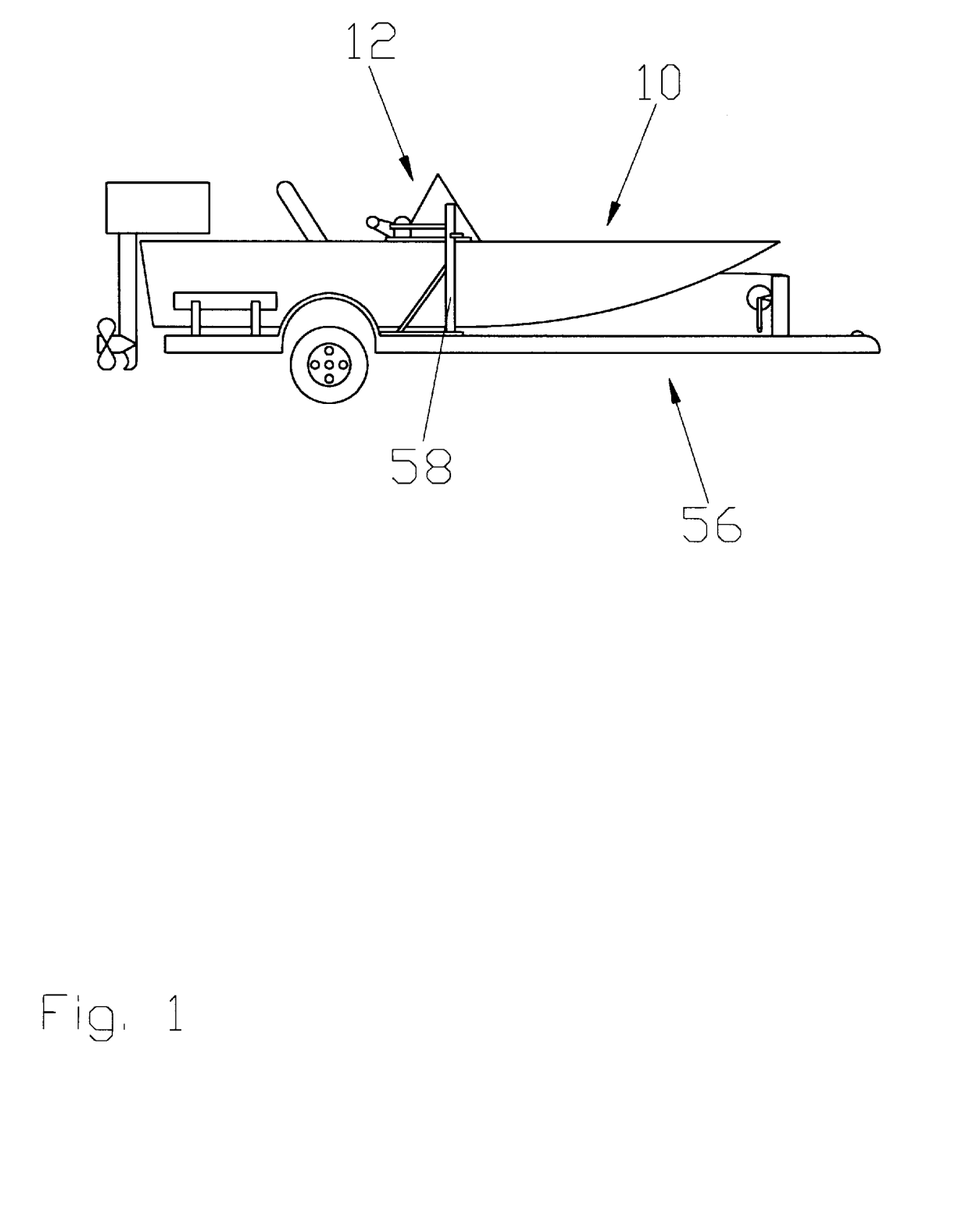
FIG. 1 is a side view of the boat releasing/securing device attached to a boat and a boat trailer.

FIG. 1 shows a side view of a basic version of the location of a basic version of our invention attached to a boat 10 and trailer 56. Attached to boat 10 is our securing/releasing device 12. Attached to the trailer is a trailer post assembly 58 onto which our releasing/securing device 12 operates.

Figure 2:
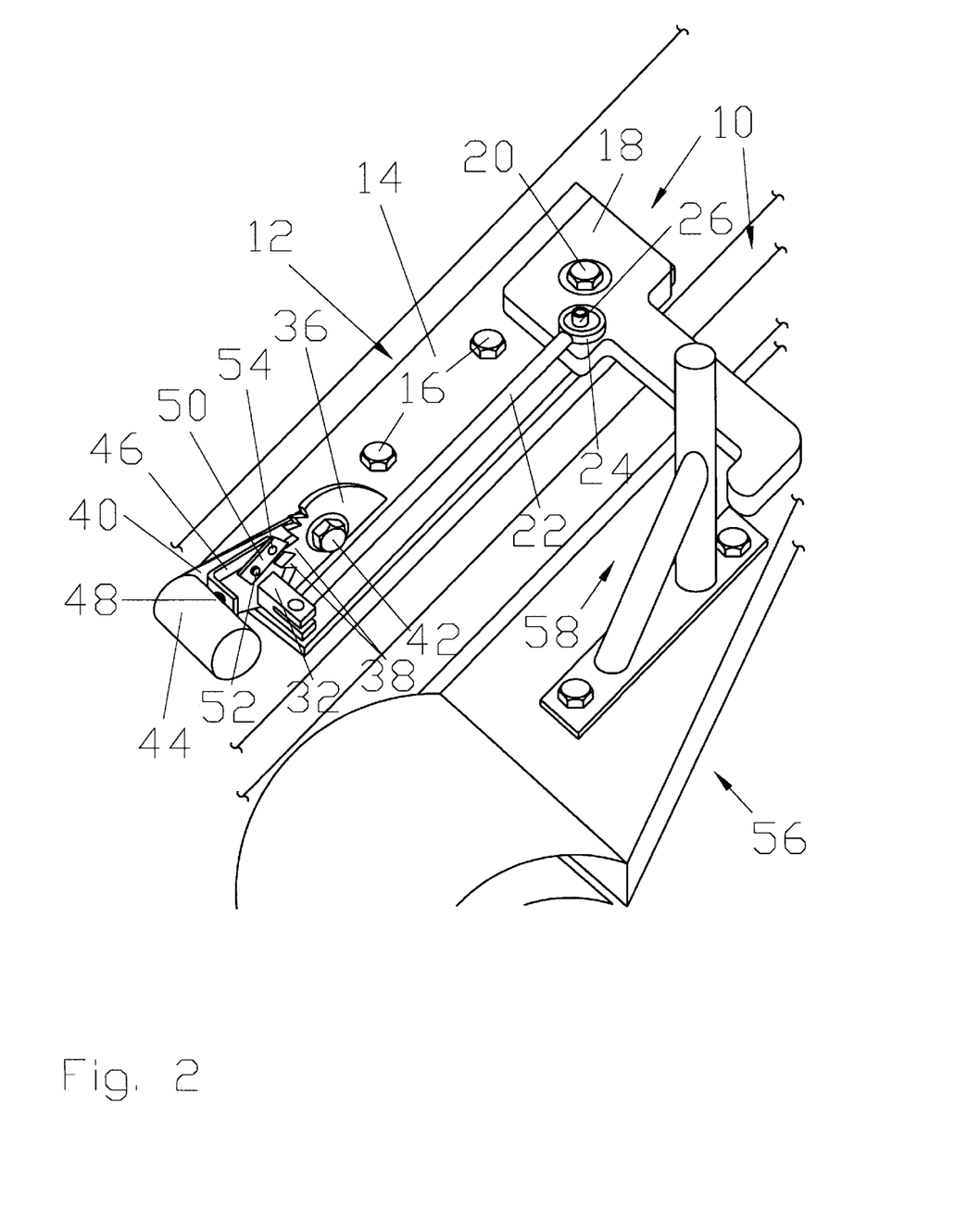
FIG. 2 is a perspective view of releasing/securing device.

FIG. 2 shows a perspective view of our releasing/securing device 12. Attached to a side of the boat 10 is a base plate 14 using base plate fasteners 16 and trailer 56 with trailer post assembly 58. Engaging arm 18 is pivotally attached to the base plate 14 by a engaging arm pivot bolt 20. A control rod 22 is pivotally connected at one end to the engaging arm 18 with a control rod spherical bearing 24 and control rod pivot bolt 26. The other end of the control rod 22 is pivotally connected to a control rod stand-off 32 using a control rod clevis bolt 30. The control rod stand-off 32 is pivotally connected to a lever arm 40 using a stand-off block fastener 34. The lever arm 40 is pivotally connected to the center of a ratchet plate 36 using a lever arm pivot bolt 42. The ratchet plate 36 has ratchet teeth 38 machined in a rearward direction for positive locking when boat 10 is not completely up on the trailer 56. The upper end of the lever arm 40 is affixed to a lever handle 44. A release trigger 46 is urged away and downward from the lever handle 44 by a trigger return spring 48, The trigger return spring 48 is affixed at one end to the lever handle 44 with the other end affixed to the release trigger 46 urging the release trigger 46 away from the lever handle 44. The release trigger 46 is pivotally affixed to a ratchet finger 50 using a ratchet finger to trigger fastener 54. The ratchet finger 50 is pivotally affixed to the lever arm 40 using a ratchet finger pivot bolt 52. The trigger release spring 48 keeps the ratchet finger 50 in contact with the profile of the ratchet plate 36 through the release trigger 46 preventing forward movement of the lever arm 40.

Figure 3:
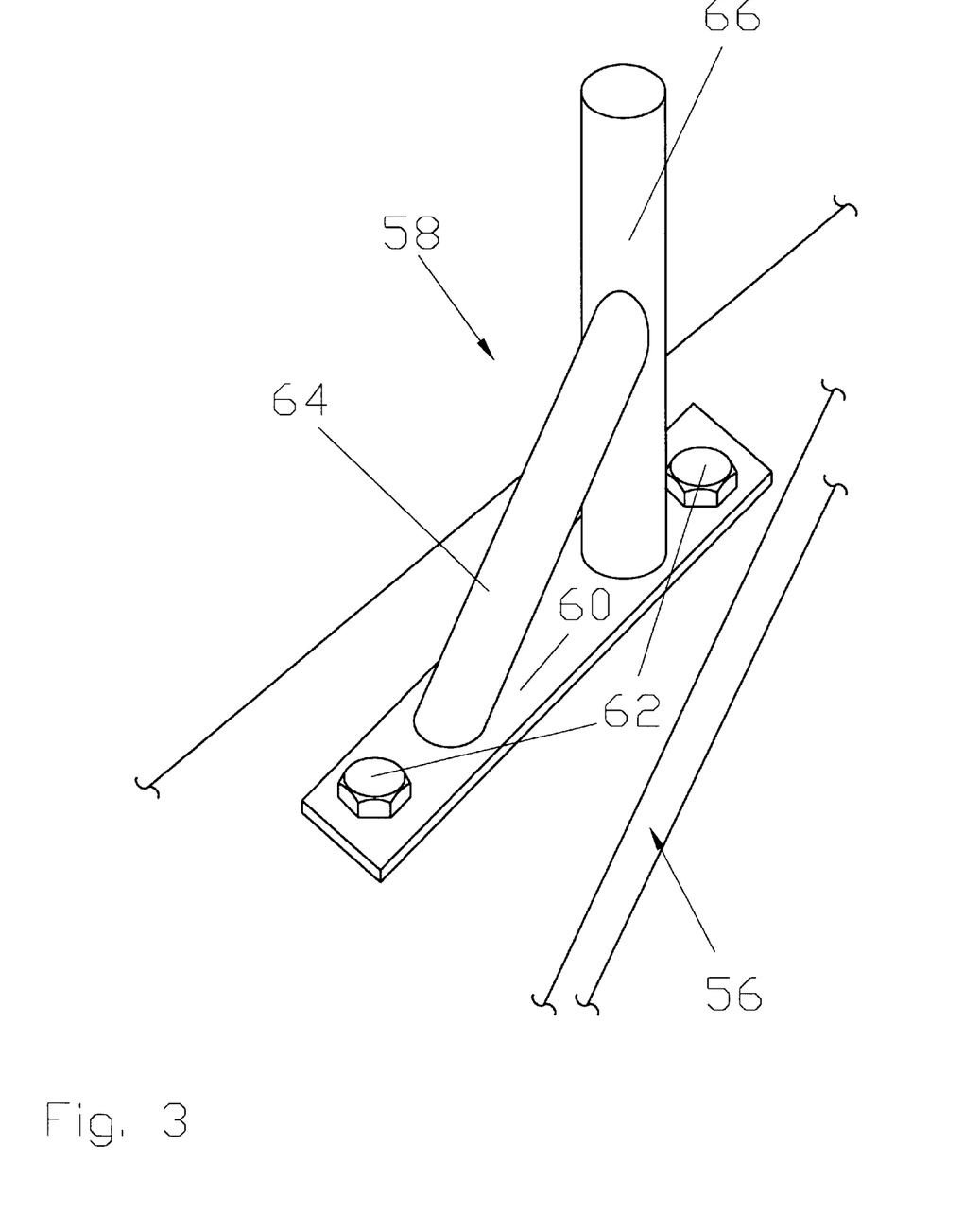
FIG. 3 is a perspective view of the trailer post.

FIG. 3 is a perspective view of a trailer post assembly 58. A trailer post base plate 60 is rigidly affixed to the trailer 56 using trailer plate bolts 62. A vertical trailer post 66 is rigidly affixed to the trailer post plate 60 at the lower end. The lower end of a cross member 64 is also rigidly affixed to the trailer post base plate 60 and the upper end is rigidly affixed to the center of the trailer post 66. The trailer post 66 extends upwardly above the releasing/securing device 12 making contact with the engaging arm 18 as shown in FIG. 2.

Figure 4:
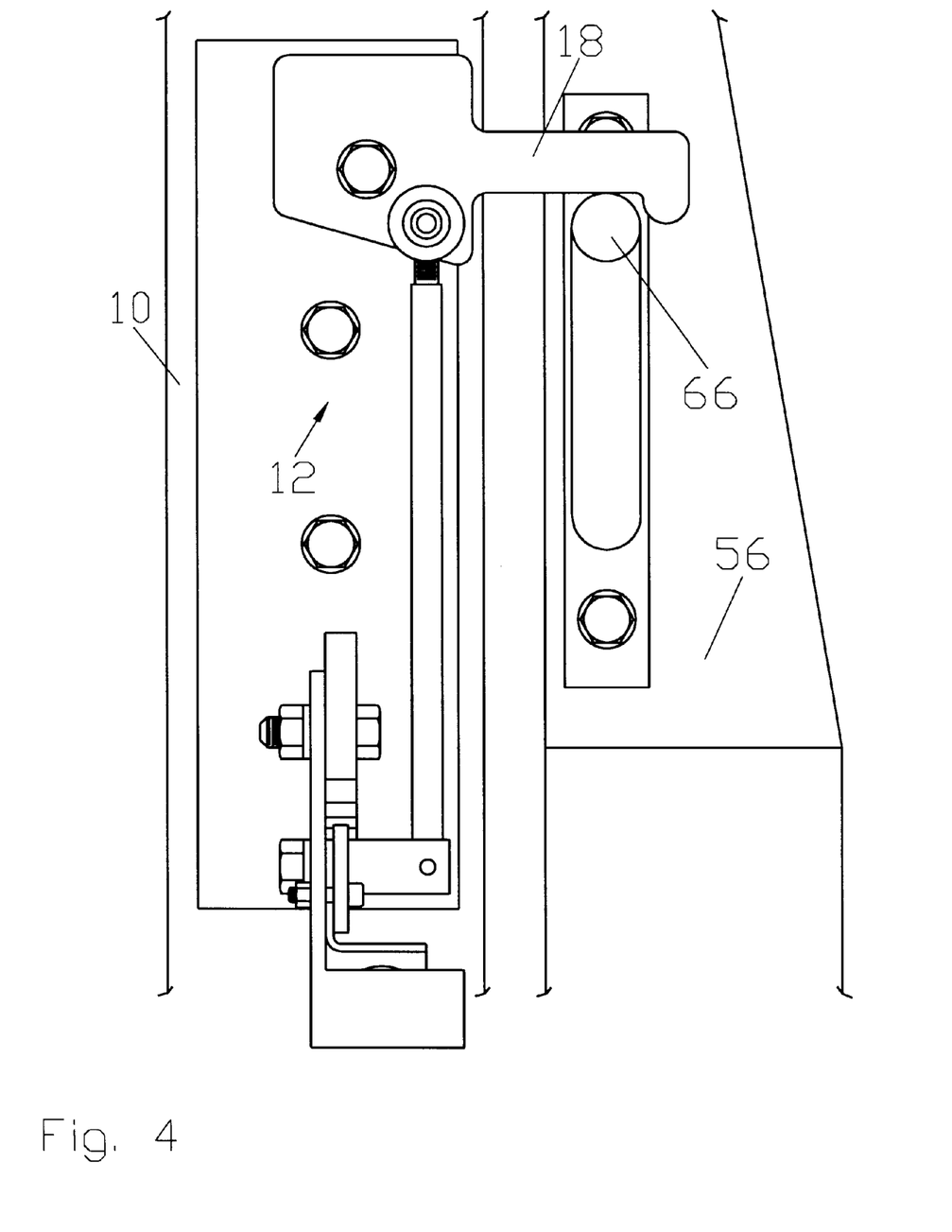
FIG. 4 is a top elevation view of the side mounted boat releasing/securing device in the "secured" position.

FIG. 4 Is a top elevation view of the side mounted releasing/securing device 12 in the secured position. The engaging arm 18 is rotated against the front side of the trailer post 66 preventing boat 10 from sliding off of trailer 56.

Figure 5:
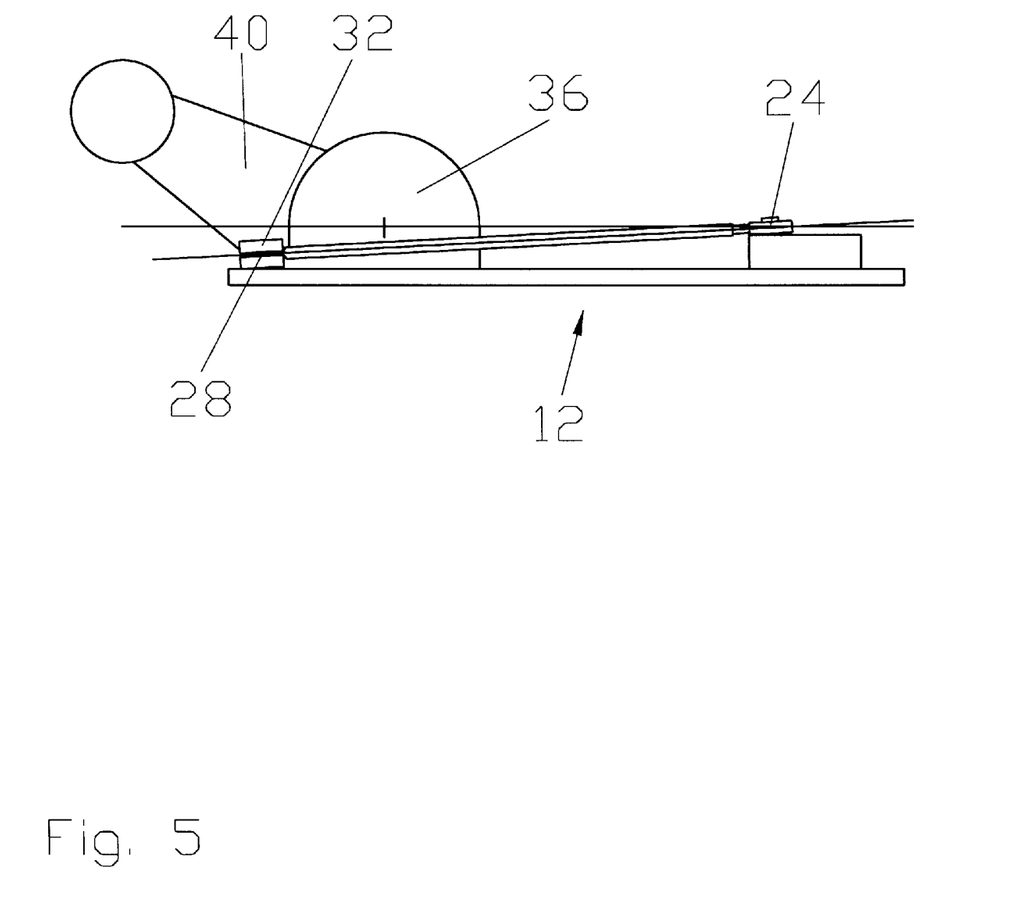
FIG. 5 is a side view of the side-mounted device illustrating the primary locking action.

FIG. 5 Is a side view of the releasing/securing device 12. When the lever arm 40 is rotated back in the "secure" position the control rod clevis 28 drops below a center line constructed between the control rod spherical bearing 24 and the center of rotation of the lever arm 40. The control rod stand-off 32 rest below the centerline on the base of the ratchet plate 36. This design provides a positive locking action. If the engaging arm 18 is urged open then the control rod stand-off 32 will be forced harder against the base of the ratchet plate 36. Therefore there is little need for the ratcheting action when the lever arm 40 is fully rotated. Also in this position the ratchet finger 50 will not be in firm engagement with the ratchet teeth 38, as illustrated in FIG. 2, preventing any binding forces on the release trigger 46 during normal operation. Thus, even if the entire weight of the boat were impinged on the engagement arm 18 the releasing/securing device 12 would operate with minimal effort and wear.

Figure 6:
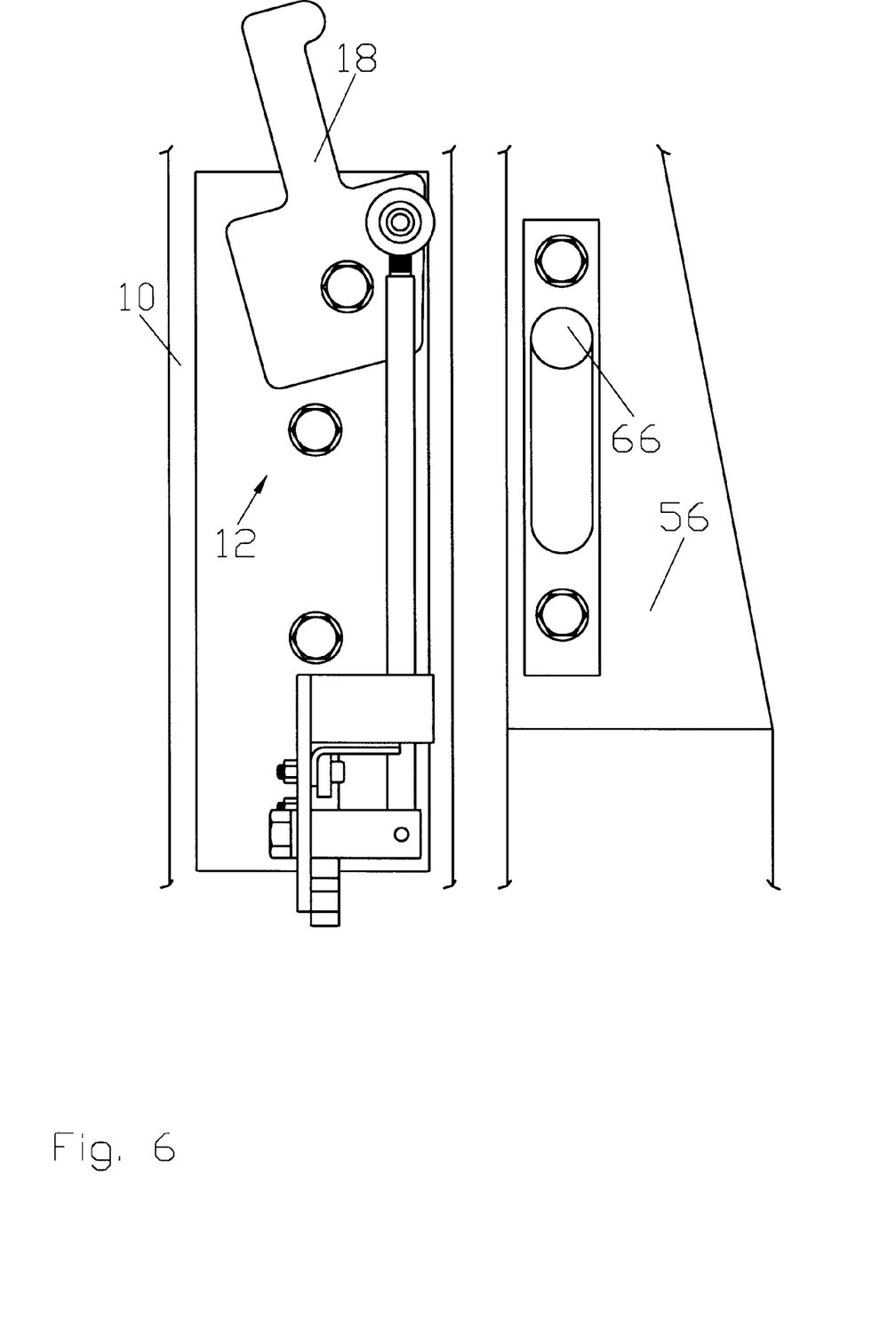
FIG. 6 is a top elevation view of the side-mounted boat to releasing/securing device in the "released" position.

FIG. 6 Is a top elevation view of the side mounted releasing/securing device 12 in the released position. The engaging arm 18 is rotated away from the trailer post 66 freeing the boat 10 from the trailer 56.

Figure 7:
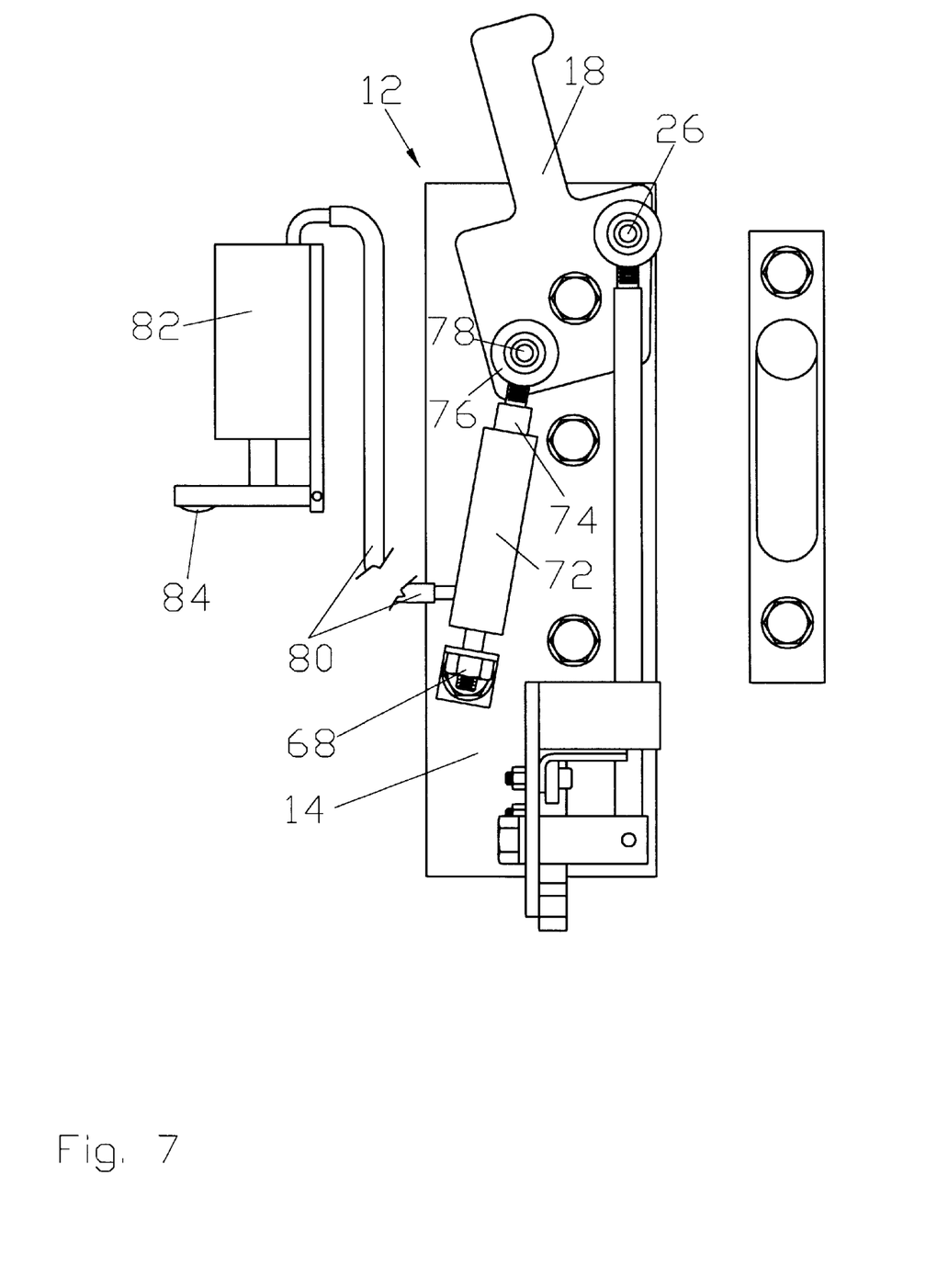
FIG. 7 is a top elevation view of the side-mounted boat to releasing/securing showing the optional remotely controlled single acting actuator.

FIG. 7 Is a top elevation view of the side mounted releasing/securing device 12 with a pneumatic actuator 72 in the released postition. A foot pedal 84 is pivotally connected to an air pump 82 and is located near a foot of the operator. An air hose 80 is connected to the discharge of the air pump 82 at one and to the actuator 72 at the other end. The actuator 72 is pivotally mounted on one end to the base plate 14 using an actuator pivot bolt 68. An actuator rod 74 extends outwardly from the actuator 72 and is pivotally connected to the engaging arm 18 diagonally opposite to the control rod pivot bolt 26 by an actuator rod spherical bearing 76 and an actuator pivot bolt 78.

Figure 8:
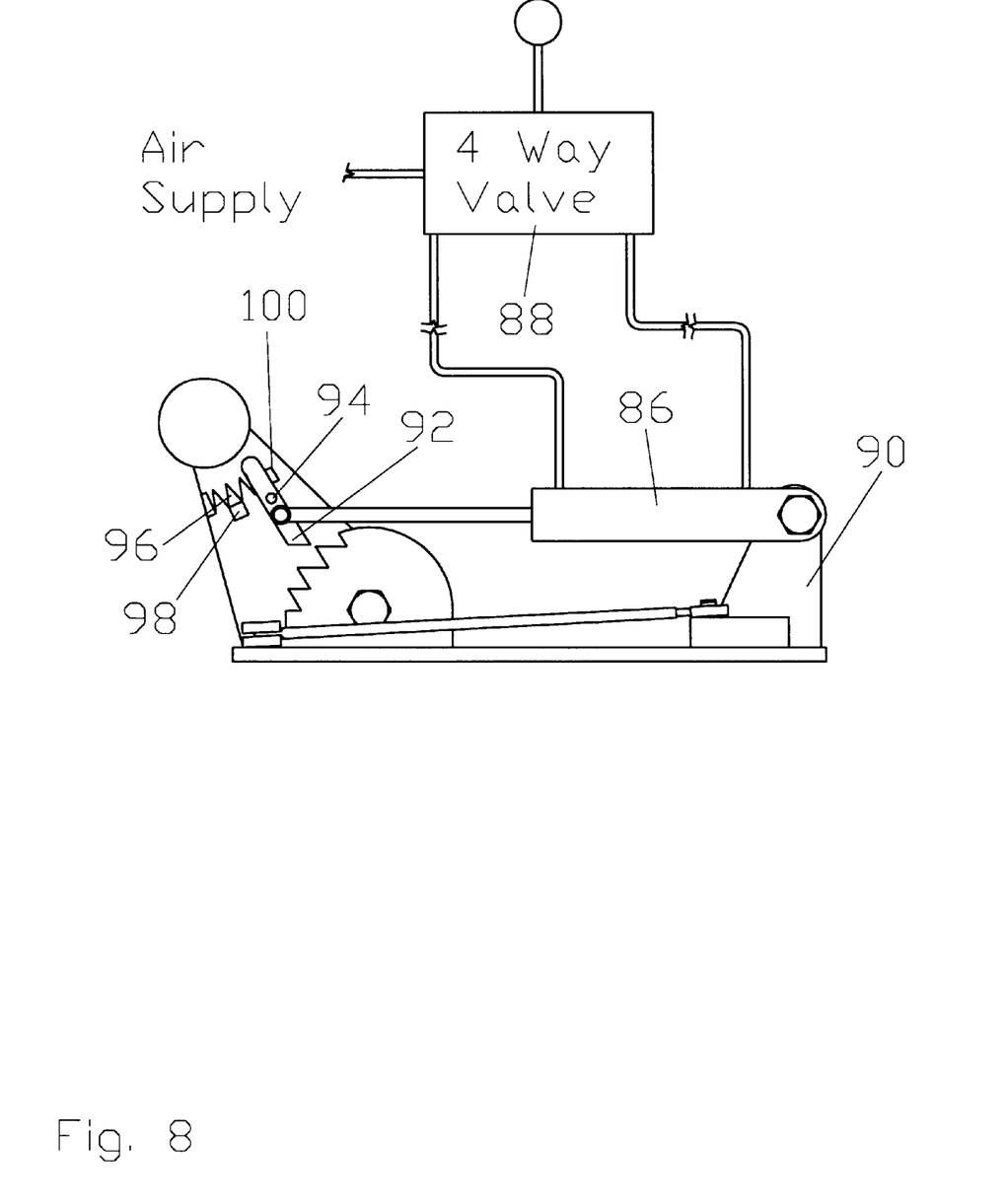
FIG. 8 is a side view of the side mounted device illustrating the boat releasing/securing device utilizing an optional remotely controlled double acting actuator.

FIG. 8 Is a side view of the side mounted releasing/securing device 12 with a double acting pneumatic actuator 86. One side of the pneumatic actuator 86 is pivotally mounted to an actuator stand-off 90 which is affixed to the base plate 14. The other side of the pneumatic actuator 86 is pivotally attached to a ratchet pawl 92. The ratchet pawl 92 is pivotally attached to the lever arm 40 so that actuation of the pneumatic actuator 86 will cause the ratchet pawl 92 to rotate about the lever arm 40 until the ratchet pawl 92 makes contact with a ratchet pawl stop 98 which is affixed to the lever arm 40. A return spring 96 will urge the ratchet pawl 92 in the opposite direction, into contact with the ratchet plate 36 and/or pawl limit stop 100. A four-way valve 88 is pneumatically connected to the pneumatic actuator 86.

PREFERRED EMBODIMENT—OPERATION
Boat Releasing Procedure

The procedure for releasing boat 10 from the trailer 56 is as follows: Ensure the engaging arm 18 is extended out toward the trailer post 66. Back boat 10 and trailer 56 into the water down a boat ramp after unhooking a winch 70. Once the boat 10 is in the water and the boat operator decides to release the boat 10 from the trailer 56, they will place their hand on the lever handle 44 and pull the release trigger 46 up which will raise the ratchet finger 50 and clear the ratchet teeth 38. The operator may then rotate the lever arm 40 toward the prow of the boat 10. When the lever arm 40 is rotated forward, the control rod 22 also moves forward urging the engaging arm 18 to rotate about the engaging arm pivot bolt 20 thereby rotating the engaging arm 18 forward and away from the trailer post 66. The weight of the lever handle 44 will aid in maintaining this position of the releasing/securing device 12. At this time the boat 10 is free from the trailer 56.

Boat Securing Procedure

The procedure for securing the boat 10 to the trailer 56 is as follows: Power the boat 10 onto the trailer 56. Once boat 10 is over the trailer 56 the operator will rotate the lever arm 40 toward the transom of the boat 10. This movement of the lever arm 40 will cause the control rod 22 to rotate the engaging arm 18 about the engaging arm pivot bolt 20 to a position around the trailer post 66. The weight of the lever handle 44 will aid in maintaining this position of the releasing/securing device 12. At this time, the boat 10 and trailer 56 may be removed from the water to a place where the winch 70 may be conveniently connected to the boat 10.

Boat Securing with Single-acting Actuator Procedure

The procedure for securing the boat 10 to the trailer 56 using a pneumatic actuator is as follows: Power the boat 10 onto the trailer 56. Once the boat 10 is over the trailer 56, the operator will depress a foot pedal 84 causing an air pump 82 to force air through an air hose 80 into a single acting pneumatic actuator 72. The actuator 72 will extend forcing the engaging arm 18 to rotate about the engaging arm pivot bolt 20 to a position around the trailer post 66. The weight of the lever handle 44 will aid in maintaining this position of the releasing/securing device 12. At this time, the boat 10 and trailer 56 may be safely removed from the water.

Boat Releasing with the Double-acting Actuator Procedure

The procedure for releasing the boat 10 from the trailer 56 using a double acting pneumatic actuator 86 is as follows: After backing the boat 10 and trailer 56 down a ramp into the water, the boat operator will move the four-way valve 88 in a direction that will cause the pneumatic cylinder 86 to retract. When the cylinder retracts, the ratchet pawl 92 will first be lifted off of the ratchet plate 36 and continue to rotate against the return spring 96 until the ratchet pawl 92 comes into contact with the ratchet pawl stop 98. Immediately after the ratchet pawl 92 contacts the ratchet pawl stop 98, the lever arm 40 will begin to rotate causing the releasing/securing device 12 to move to the released position as described shown in FIG. 6.

Boat Securing with the Double-Acting Actuator Procedure

The procedure for securing the boat 10 to the trailer 56 using a double acting pneumatic actuator 86 is as follows:

Once the operator has powered the boat 10 onto the trailer 56, the boat operator will position the four-way valve 88 to the "secure" position which will cause the pneumatic cylinder 86 to extend. The extension of the pneumatic cylinder 86 will urge the ratchet pawl 92 against the ratchet plate 36. As soon as the ratchet pawl 92 makes contact with the ratchet plate 36, the lever arm 40 will begin to rotate back to the secured position shown in FIG. 4. The locking mechanism is not supplemented with the pneumatic cylinder but is the same as shown in FIG. 5 and described prior in this application.

Similar procedures may be used for an electric of hydraulic actuator. The controls of these actuators may be located at convenient locations including the operators console or the engine throttle handle.

CONCLUSIONS, RAMIFICATIONS, AND SCOPE

Accordingly, it can be seen that our boat releasing and securing invention provides a reliable, safe, and practical, yet economical device that can be used by persons of almost any age.

Although the description above contains many specificities, these should not be construed as limiting the scope of the invention but as merely providing illustrations of some of the presently preferred embodiments of this invention. Various other embodiments and ramifications are possible within it's scope. For example, the use of electric or hydraulic actuation of the latching arm around the trailer post.

Thus the scope of the invention should be determined by the appended claims and their legal equivalents, rather than by the examples given.

What is claimed is:

1. A boat to boat trailer releasing and securing device comprising:
    a) a baseplate having a prow side and a transom side,
    b) a mounting means to affix said base plate to a driver's side of the boat,
    c) a lever having an upper end and a center of rotation,
    d) a mounting means whereby said lever is pivotally mounted about its center of rotation to the transom side of said baseplate allowing said lever to be rotated forward and rearward,
    e) a post being substantially vertical and having a prow side,
    f) a mounting means to affix said post to the driver's side of the boat trailer,
    g) an arm being substantially horizontal and having a transom side,
    h) a mounting means for said arm wherein said arm is rotatably affixed to the prow side of said baseplate and said lever so that forward rotation of said lever causes said arm to rotate and engage the transom side of said arm to the prow side of said post and rearward rotation of said lever causes said arm to rotate in an opposite direction and disengage said post allowing said boat to float off of said trailer when said boat and said trailer are in water, and,
    i) a locking means affixed between said lever and said baseplate whereby the position of said lever and said arm will remain fixed relative to said post until unlocked by a boat driver.

2. The device of claim 1 wherein said locking means comprises a raised plate about which said lever rotates whereby the upper end of said lever will drop below the center of rotation of said lever in a rearward direction thereby preventing forward rotation of said lever when the transom side of said arm is urged by the prow side of said trailer post.

3. The device of claim 1 wherein said locking means comprises:
 a) a trigger slidably affixed to said lever having a handle on one end and a finger on the other, and
 b) a ratchet plate about which said lever rotates having ratchet teeth whereby the finger of said trigger will engage with the ratchet teeth of said ratchet plate preventing forward movement of said lever until released by the boat operator.

4. The device of claim 3 wherein said ratchet plate is raised sufficiently to allow the upper end of said lever to rotate below the center of rotation of said lever in a rearward direction thereby preventing forward movement of said lever when said arm is urged by the prow side of said trailer post.

5. The device of claim 1 further comprising a pneumatic actuator having one end affixed to said boat and another end affixed to said arm whereby actuation of said actuator will position said arm against the prow side of said trailer post.

6. The device of claim 1 further comprising a electric actuator having one end affixed to said boat and another end affixed to said arm whereby actuation of said actuator will position said arm against the prow side of said trailer post.

7. The device of claim 1 further comprising a hydraulic actuator having one end affixed to said boat and another end affixed to said arm whereby actuation of said actuator will position said arm against the prow side of said trailer post.

* * * * *